UNITED STATES PATENT OFFICE.

WILHELM LOMMEL, OF ELBERFELD, GERMANY, ASSIGNOR TO FARBENFABRIKEN VORM. FRIEDR. BAYER & CO., OF ELBERFELD, GERMANY, A CORPORATION OF GERMANY.

OXAZIN DYE.

985,424.  Specification of Letters Patent.  Patented Feb. 28, 1911.

No Drawing.  Application filed September 22, 1910.  Serial No. 583,190.

*To all whom it may concern:*

Be it known that I, WILHELM LOMMEL, doctor of philosophy, chemist, citizen of the German Empire, residing at Elberfeld, Germany, have invented useful Improvements in New Dye, of which the following is a specification.

I have found that new dyestuffs of the oxazin series dyeing on a mordant can be obtained by condensing para-nitrosophenols with pyrogallol derivatives, especially gallic acid, gallic acid esters, gallaminic acid, gallanilid, pyrogallol sulfonic acid, etc. The new products are after being dried and pulverized brown to black powders soluble with difficulty in water, soluble in dilute caustic soda lye generally with a violet to brown color, furnishing from red-brown to violet chrome lakes on the fiber, which are distinguished by a good fastness to washing and to chlorin. The leuco compounds of the new dyes can be produced by treating the dyes with reducing agents.

In order to illustrate the new process more fully the following example is given, the parts being by weight:—17 parts of gallaminic acid are introduced into 250 parts of sulfuric acid of 60° Bé., 18 parts of para-nitrosophenol are added and then the temperature of the mixture is slowly increased to 70° C. When the reaction is complete the mixture is poured on ice water and the dye is filtered off with suction. It is a dark powder which is soluble in dilute caustic soda lye with a violet color, soluble in concentrated sulfuric acid with a reddish-violet color; it furnishes a chrome lake on the fiber which is red-violet fast to washing and to chlorin. Other para-nitrosophenols, such as nitrosocresols may be used.

The new products can be used as dyestuffs or in the shape of their valuable leuco compounds. The dye obtained as described in the example e. g. is dissolved in the calculated quantity of NaOH and is then reduced with hydrosulfite. The resulting leuco compound can be used as paste or powder. It is soluble in concentrated sulfuric acid with a yellowish-green color.

On treating the new compounds with sulfurous acid or its salts such as bisulfites, sulfites, compounds are obtained which are probably modified leuco compounds and which are very suitable for printing purposes. They differ from the parent substances in so far as they are better fixed upon the fiber and produce shades which are generally browner than the original shades. If the products obtained by the action of sulfurous acid substances are further treated with acids, they are again modified in their properties and produce shades different from those produced with the mother substances and the sulfurous acid modifications.

On treating e. g. the dye described in the example with a bisulfite solution a product is obtained which furnishes on the fiber a chrome lake which is a reddish-corinth, browner than the lake of the parent material. On heating the latter compound with hydrochloric acid a new product results which furnishes a chrome lake being a corinth which is bluer than that obtained from the bisulfite product.

I claim:—

1. The herein described new dyestuffs of the gallo-cyanin series obtainable by reacting with para-nitrosophenols upon pyrogallol derivatives, which products are after being dried and pulverized brown to black powders soluble with difficulty in water, soluble in dilute caustic soda lye generally with a violet to brown color; furnishing from brown to violet chrome lakes on fiber; furnishing leuco compounds upon treatment with reducing agents and modified leuco compounds upon treatment with sulfurous acid substances, which latter compounds are further modified upon treatment with acids, substantially as described.

2. The herein described new dyestuff of the gallo-cyanin series obtainable by reacting with para-nitrosophenol upon gallaminic acid, which dye is after being dried and pulverized a dark powder soluble in dilute caustic soda lye with a violet color; being dissolved by concentrated sulfuric acid with a reddish-violet color; furnishing a red-violet chrome lake on fiber; furnishing a leuco compound upon treatment with reducing agents; and furnishing a modified compound upon treatment with a bisulfite; which furnishes a reddish-corinth chrome lake browner than that obtained from the parent material, which modified compound yields a compound producing a corinth chrome lake bluer than that of the bisulfite compound upon treatment with an acid, substantially as described.

In testimony whereof I have hereunto set my hand in the presence of two subscribing witnesses.

WILHELM LOMMEL. [L. S.]

Witnesses:
CHAS. J. WRIGHT,
WALTER VONNEGUT.